(12) United States Patent
Kinoshita et al.

(10) Patent No.: US 11,162,570 B2
(45) Date of Patent: Nov. 2, 2021

(54) TORSIONAL DAMPER

(71) Applicants: NOK CORPORATION, Tokyo (JP); HONDA MOTOR CO., LTD., Tokyo (JP)

(72) Inventors: Shinya Kinoshita, Tottori (JP); Yuk Ito, Wako (JP); Takashi Kondo, Waco (JP); Masaya Miyazawa, Waco (JP); Kei Mochizuki, Waco (JP)

(73) Assignees: NOK CORPORATION; Honda Motor Co., Ltd.

( * ) Notice: Subject to any disclaimer, the term of this patent is extended or adjusted under 35 U.S.C. 154(b) by 366 days.

(21) Appl. No.: 16/223,732

(22) Filed: Dec. 18, 2018

(65) Prior Publication Data
US 2019/0186611 A1 Jun. 20, 2019

(30) Foreign Application Priority Data
Dec. 19, 2017 (JP) .............................. JP2017-242672

(51) Int. Cl.
| | | |
|---|---|---|
| *F16H 55/36* | (2006.01) | |
| *F16H 55/40* | (2006.01) | |
| *F16H 55/48* | (2006.01) | |
| *F16F 15/126* | (2006.01) | |

(52) U.S. Cl.
CPC ........... *F16H 55/36* (2013.01); *F16F 15/126* (2013.01); *F16H 55/40* (2013.01); *F16H 55/48* (2013.01); *F16H 2055/366* (2013.01)

(58) Field of Classification Search
CPC ................ F16F 15/126; F16F 15/1442; F16H 2055/366; F16H 55/36; Y10T 74/2131

USPC .......................................................... 474/94
See application file for complete search history.

(56) References Cited

U.S. PATENT DOCUMENTS

| 432,081 | A | | 7/1890 | Richardson | |
|---|---|---|---|---|---|
| 1,751,007 | A | * | 3/1930 | Kreissig | B60B 17/0055 295/15 |
| 2,723,573 | A | * | 11/1955 | Dillman | F16F 15/1442 74/574.4 |
| 2,972,904 | A | * | 2/1961 | Troyer | F16F 15/1442 74/574.4 |
| 3,101,214 | A | * | 8/1963 | Talboys | B60B 17/0044 295/1 |
| 3,280,654 | A | * | 10/1966 | Arnt, Jr. | F16F 15/126 74/574.4 |
| 3,479,907 | A | * | 11/1969 | Hall | F16F 15/126 74/574.4 |

(Continued)

FOREIGN PATENT DOCUMENTS

| CN | 85102692 A | 1/1986 |
|---|---|---|
| CN | 2844568 Y | 12/2006 |

(Continued)

*Primary Examiner* — Henry Y Liu
(74) *Attorney, Agent, or Firm* — Harness, Dickey & Pierce, P.L.C.

(57) ABSTRACT

In a torsional damper, a damper mass is connected to a hub through a damper rubber. The hub is provided with a boss fixed to a crankshaft and a rim holding the damper rubber. The boss and the rim are coupled by plurality of spokes. The plurality of spokes each has an inclined shape inclined in the axial direction. Reinforcement portion is provided in the spokes in one direction corresponding to a bending vibration to be input among the plurality of spokes.

4 Claims, 7 Drawing Sheets

(56) References Cited

U.S. PATENT DOCUMENTS

| | | | | | |
|---|---|---|---|---|---|
| 4,710,152 A | * | 12/1987 | Ichikawa | | F16F 15/126 474/166 |
| 4,794,816 A | * | 1/1989 | Serizawa | | F16F 15/126 474/166 |
| 4,815,332 A | * | 3/1989 | Serizawa | | F16F 15/126 368/171 |
| 4,962,677 A | * | 10/1990 | Withers | | F16F 15/1442 74/574.2 |
| 4,973,292 A | * | 11/1990 | Mevissen | | F16H 55/36 474/192 |
| 5,120,279 A | * | 6/1992 | Rabe | | B29C 37/005 474/161 |
| 5,148,719 A | * | 9/1992 | Ampferer | | F16F 15/126 74/574.4 |
| 5,231,893 A | * | 8/1993 | Sisco | | F16F 15/126 74/574.4 |
| 5,441,456 A | * | 8/1995 | Watanabe | | B21D 53/261 29/892.11 |
| 5,453,056 A | * | 9/1995 | Ullrich | | F16H 55/36 474/94 |
| 5,465,485 A | * | 11/1995 | Miyake | | F16F 15/126 29/892.11 |
| 5,540,626 A | * | 7/1996 | Asai | | F16F 15/124 474/178 |
| 5,562,544 A | * | 10/1996 | Ochs | | F16F 15/1442 464/89 |
| 5,591,093 A | * | 1/1997 | Asai | | F16D 3/76 474/94 |
| 5,630,769 A | * | 5/1997 | Schmidt | | B60B 5/02 474/167 |
| 5,843,264 A | * | 12/1998 | Mabuchi | | F16F 1/44 156/245 |
| 5,966,996 A | * | 10/1999 | Hamaekers | | F16F 15/1442 464/180 |
| 5,987,952 A | * | 11/1999 | Kutzscher | | B21D 22/16 29/894.362 |
| 6,171,194 B1 | * | 1/2001 | Haga | | F16D 3/52 464/89 |
| 6,216,327 B1 | * | 4/2001 | Hendrian | | B25B 27/02 29/278 |
| 6,386,065 B1 | * | 5/2002 | Hodjat | | F16F 15/126 474/94 |
| 6,684,735 B2 | * | 2/2004 | Watanabe | | F16F 15/1203 428/450 |
| 6,875,113 B2 | * | 4/2005 | Nichols | | F16F 15/1442 464/90 |
| 6,984,432 B2 | * | 1/2006 | Tagawa | | F16F 15/126 428/64.1 |
| 7,055,243 B2 | * | 6/2006 | Hodjat | | B21D 53/261 29/892.11 |
| D533,052 S | * | 12/2006 | Hodjat | | D8/360 |
| 7,166,678 B2 | * | 1/2007 | Dunlap | | B32B 1/08 525/242 |
| 7,197,959 B2 | * | 4/2007 | Crissy | | F16F 15/126 464/90 |
| 7,597,029 B2 | * | 10/2009 | Bernard | | F16F 15/1203 464/180 |
| 7,658,127 B2 | * | 2/2010 | Crist | | F16F 15/1442 74/574.4 |
| 7,850,557 B2 | * | 12/2010 | Moriya | | F16H 55/36 474/94 |
| 8,202,183 B2 | * | 6/2012 | Riu | | F16D 41/203 474/94 |
| 8,496,552 B2 | * | 7/2013 | Kvasnicka | | F02B 67/06 474/148 |
| 8,517,845 B2 | * | 8/2013 | Shin | | F16F 15/126 464/89 |
| 8,617,016 B2 | * | 12/2013 | Dutil | | F16H 55/36 474/166 |
| 8,920,271 B2 | * | 12/2014 | Burke | | F16D 3/68 474/94 |
| 9,121,471 B2 | * | 9/2015 | Manzoor | | F16F 15/1442 |
| 9,273,772 B2 | * | 3/2016 | Ichikawa | | F16H 55/38 |
| 9,273,773 B2 | * | 3/2016 | Vukojicic | | F16H 55/36 |
| 9,605,744 B2 | * | 3/2017 | Mandel | | B22F 7/08 |
| 9,945,439 B2 | * | 4/2018 | Manzoor | | F16F 15/1442 |
| 10,655,724 B2 | * | 5/2020 | Manzoor | | F16H 55/36 |
| 2003/0199348 A1 | * | 10/2003 | Huber | | F16D 3/68 474/94 |
| 2004/0069093 A1 | * | 4/2004 | Bernard | | F16F 15/3153 464/180 |
| 2004/0166974 A1 | * | 8/2004 | Hodjat | | F16F 15/126 474/94 |
| 2005/0204858 A1 | * | 9/2005 | Crist | | F16H 7/18 74/574.4 |
| 2006/0030441 A1 | * | 2/2006 | Watanabe | | F16F 15/126 474/166 |
| 2006/0094547 A1 | * | 5/2006 | Xu | | F16F 15/126 474/94 |
| 2006/0172832 A1 | * | 8/2006 | Watanabe | | F16H 55/36 474/94 |
| 2007/0232427 A1 | * | 10/2007 | Ueno | | F16H 55/48 474/199 |
| 2008/0219607 A1 | * | 9/2008 | Murao | | F16H 55/48 384/417 |
| 2009/0000422 A1 | * | 1/2009 | Christenson | | F16F 7/108 74/574.4 |
| 2011/0300979 A1 | * | 12/2011 | Dutil | | F16H 55/40 474/166 |
| 2012/0065011 A1 | * | 3/2012 | Kvasnicka | | F02B 67/06 474/148 |
| 2012/0231909 A1 | * | 9/2012 | Shin | | F16F 15/126 474/94 |
| 2013/0095964 A1 | * | 4/2013 | Shin | | F16F 15/126 474/94 |
| 2014/0155210 A1 | * | 6/2014 | Ichikawa | | F16C 33/586 474/174 |
| 2017/0059028 A1 | * | 3/2017 | Manzoor | | F16F 15/127 |
| 2017/0314637 A1 | * | 11/2017 | Manzoor | | F16F 15/1442 |

FOREIGN PATENT DOCUMENTS

| | | |
|---|---|---|
| CN | 104455198 A | 3/2015 |
| CN | 204226604 U | 3/2015 |
| EP | 2 383 490 B1 | 3/2013 |
| JP | S60-065448 U | 5/1985 |
| JP | S61-123261 U | 8/1986 |
| JP | H08-285013 A | 11/1996 |
| JP | 2002-357244 A | 12/2002 |
| JP | 2003-343653 A | 12/2003 |
| JP | 2005-016654 A | 1/2005 |
| JP | 2007-139107 A | 6/2007 |
| JP | 4416493 B2 | 2/2010 |
| JP | 2012-177469 A | 9/2012 |
| JP | 2017-129189 A | 7/2017 |

* cited by examiner

TORSIONAL DAMPER

CROSS REFERENCE TO RELATED APPLICATION

The present application is based on Japanese Priority Document P2017-242672 filed on Dec. 19, 2017, the entire content of which is incorporated herein by reference.

BACKGROUND OF THE INVENTION

Field of Invention

The present invention relates to a torsional damper absorbing and reducing vibrations generated in rotation shafts, such as a crankshaft, of an automobile engine.

Description of the Related Art

A torsional damper is known in which a damper mass is connected to a hub through a damper rubber (for example, see Japanese Patent Laid-Open No. 2002-357244). The torsional damper sets a resonance system containing a damper rubber as a spring and containing a damper mass as an inertial mass to absorb and reduce a torsional vibration and the like generated in a rotation shaft.

As a recent trend of a motor automobile industry, the downsizing of an engine is one trend in order to achieve low fuel consumption. The downsizing of the engine means driving the same car body with a small displacement engine. Therefore, in order to achieve the downsizing of the engine, an output increase and a torque rise in a practical speed region of an engine, a reduction in the vehicle weight, and the like have been demanded.

The engine output increase can be achieved by utilizing a turbocharger, increasing the combustion rate of the engine, or the like, for example. For the torque increase in the practical speed region, the achievement of a long stroke is a common practice. The reduction in the vehicle weight is a result of the weight reduction of each part. For the weight reduction of parts, a crankshaft tends to be made thin.

The engine output becomes higher. The rigidity of the crankshaft tends to decrease by the achievement of the long stroke and the thin shaft. The trend of the engine involving the downsizing increases the bending moment (bending vibration) of the crankshaft.

As a measure against the increase in the bending moment (bending vibration) of the crankshaft which can be taken by the torsional damper is to increase the rigidity in the bending direction of the torsional damper. In this case, it is also considered to utilize a correlation between the rotation position on the circumference of the torsional damper and the explosion timing of each piston. For example, when the vibrations in the explosions of No. 1 and No. 4 pistons in a 4-cylinder engine are large, the rigidity in the bending direction of the torsional damper in a direction where the vibrations in the explosions of the No. 1 and No. 4 pistons are input is further increased. Thus, a characteristic value (natural frequency) in the bending direction is shifted to the high frequency side, so that the bending vibrations in the explosions of No. 1 and No. 4 pistons can be positively reduced.

However, in a conventional torsional damper described in Japanese Patent Laid-Open No. 2002-357244, it cannot be said that the rigidity in the bending direction of the torsional damper is sufficient. Moreover, the directivity on the circumference is not set in the rigidity in the bending direction of the torsional damper, and therefore the bending vibration in a direction where the vibration reduction is intended cannot be positively reduced.

Accordingly, an object of the present invention is to increase the rigidity in the bending direction of the torsional damper.

Another object of the present invention is to positively reduce the bending vibration in a direction where a vibration reduction is intended.

SUMMARY OF THE INVENTION

According to the present invention, a torsional damper is provided which includes: a hub having a boss fixed to a crankshaft and a rim provided on the outer periphery side of the boss and coupling the boss and the rim through a plurality of spokes branched in the radiation direction from the boss, a damper mass connected to the hub through a damper rubber, an inclined shape inclining the plurality of spokes in the axial direction, and reinforcement portion provided in the spokes in one direction corresponding to a bending vibration to be input among the plurality of spokes.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
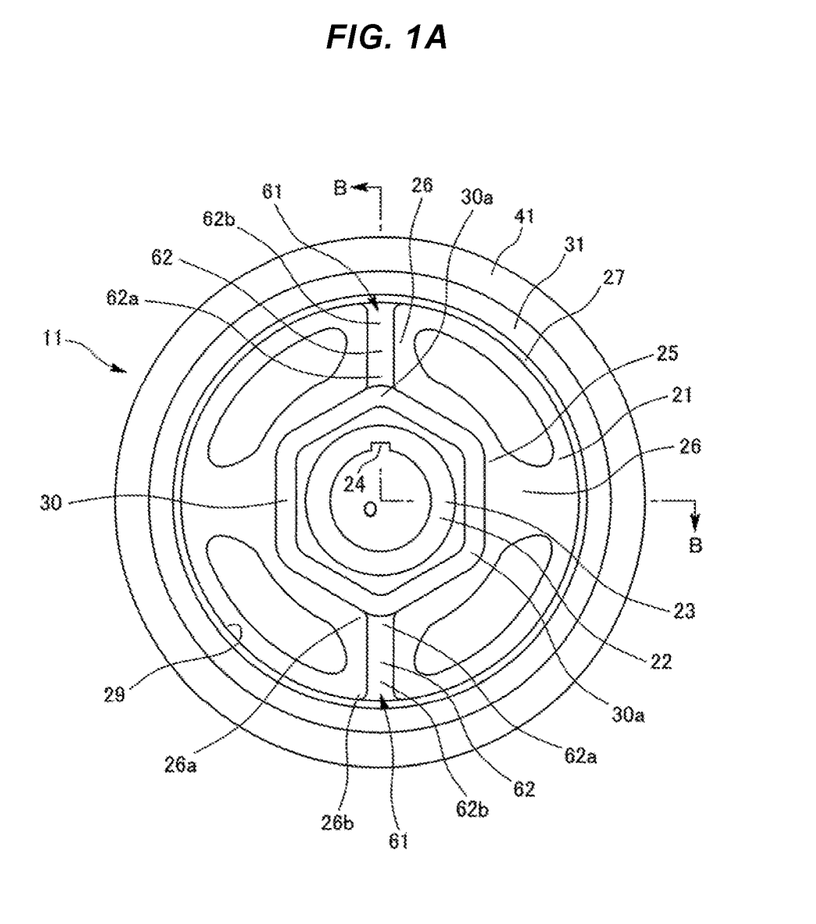
FIG. 1A is a front view illustrating a torsional damper of the present embodiment.
Figure 1B:
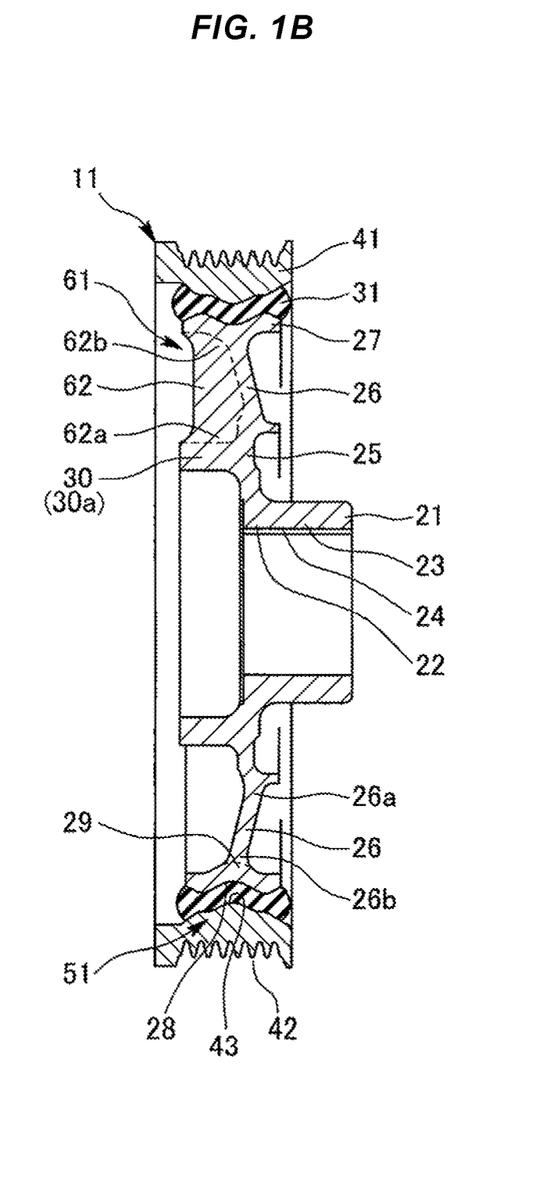
FIG. 1B is a cross-sectional view along the B-O-B line in FIG. 1A.
Figure 2:
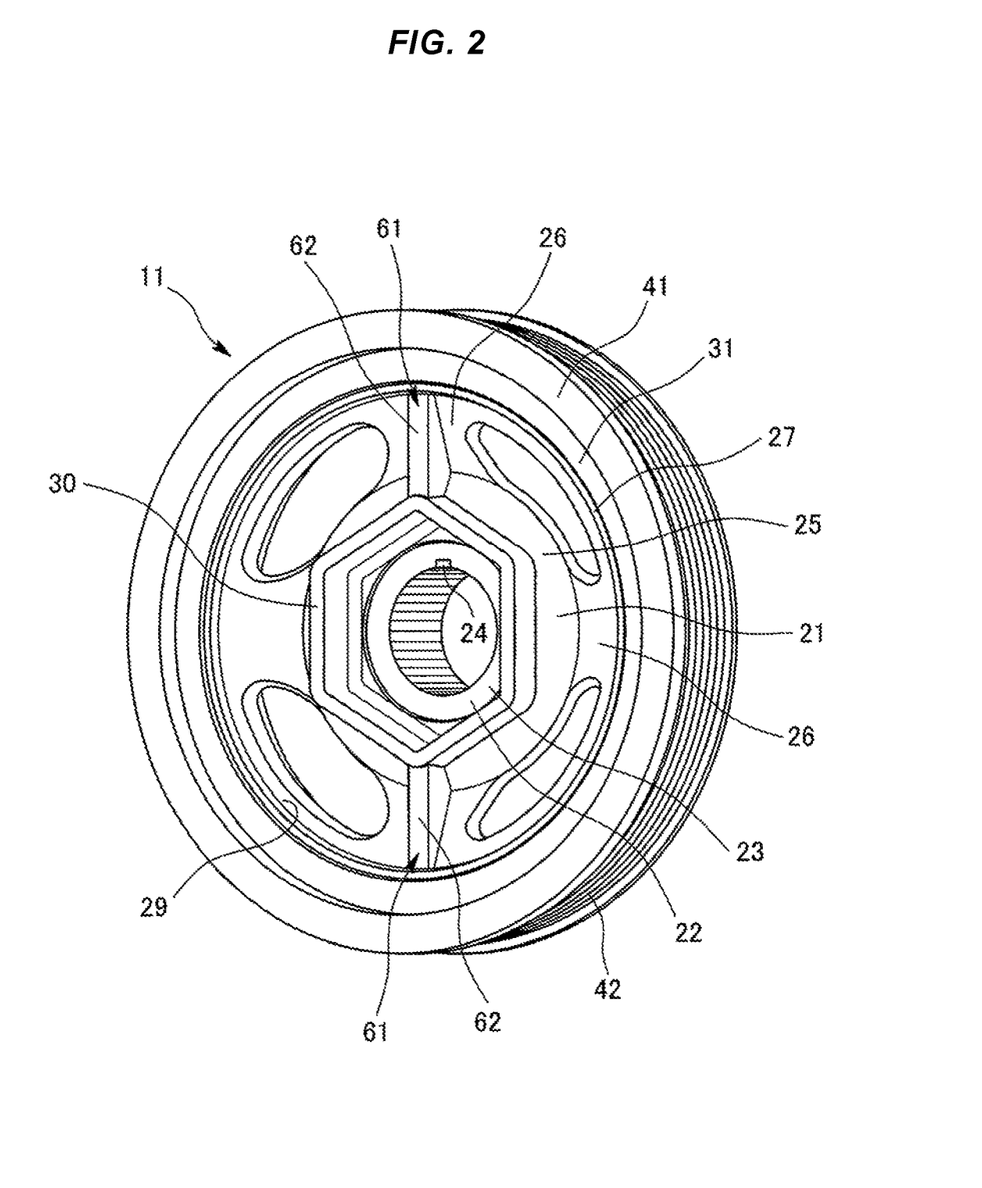
FIG. 2 is a perspective view of the torsional damper.

As illustrated in FIGS. 1A and 1B and FIG. 2, in a torsional damper 11 of the present embodiment, a damper mass (inertial mass body) 41 is connected to the outer periphery side of a hub 21 through a damper rubber (rubber elastic body) 31. In a radial gap between the hub 21 having an annular shape and an annular damper mass 41 disposed on the outer periphery side thereof, the damper rubber 31 having an annular shape is pressed in and fitted to the gap in a non-adhesion manner from any one of the axial directions. The torsional damper 11 is a torsional damper for crankshafts absorbing and reducing a torsional vibration (vibration in the circumferential direction), bending vibrations (vibration in the radial direction, vibration in the prying direction), and the like generated in a crankshaft of an automobile engine by setting a resonance system containing the damper rubber 31 as a spring and containing the damper mass 41 as an inertial mass. A belt engagement groove 42 for winding an endless belt for torque transmission is formed on the outer peripheral surface of the damper mass 41. The torsional damper 11 is also referred to as a damper belt pulley.

The hub 21 has an annular boss 22 fixed to a shaft end portion of a crankshaft (not illustrated). A spoke 26 is integrally provided on the outer periphery side of the boss 22. An annular rim 27 is integrally provided on the outer periphery side of the spoke 26.

The boss 22 has a cylindrical portion 23 provided with a key groove 24 in one place on the circumference of the inner peripheral surface. A radial rise portion (flange portion) 25 having a plane perpendicular to the shaft is integrally provided toward the radially outside from one axial end portion (front side of the torsional damper 11 and left side in FIG. 1B) of the cylindrical portion 23.

The spoke 26 is obliquely provided toward the radially outside and one axial side from an outer peripheral end portion of the radial rise portion 25 of the boss 22. An outer peripheral end portion 26b of the spoke 26 is disposed to be displaced to one axial side with respect to an inner peripheral end portion 26a, and thus the spoke 26 is formed into an inclined shape inclined in the axial direction.

Two or more of the spokes 26 are provided. The two or more of the spokes 26 are provided at equal intervals on the circumference. In detail, four spokes 26 are provided at equal intervals to be matched with the number of engine cylinders. One of the four spokes 26 is provided so that the position on the circumference is aligned with the position on the circumference of the key groove 24 and the remaining three spokes 26 are provided at 90°, 180°, and 270° positions with respect to the key groove 24 on the circumference.

The rim 27 is provided in a cylindrical shape toward both one axial side and the opposite axial side (back side of the torsional damper 11 and right side in FIG. 1B) from the outer peripheral end portion 26b of the spoke 26. The spoke 26 is integrally coupled to the inner peripheral surface of an axial center portion of the rim 27 having the cylindrical shape.

A tubular jig catcher 30 is integrally provided on the inner peripheral side of the rim 27. The jig catcher 30 has a cylindrical shape and is integrally provided toward one axial side from the vicinity of an outer peripheral end portion of the radial rise portion 25 of the boss 22. When the torsional damper 11 is attached to a shaft end portion of a crankshaft or when the torsional damper 11 is removed from a shaft end portion of the crankshaft, the jig catcher 30 is engaged in the circumferential direction by inserting a whirl-stop jig (not illustrated) whirl-stopping the hub 21. The jig catcher 30 is also formed into a polygonal shape as viewed from the front corresponding to the fact that an insertion portion of the whirl-stop jig has a polygonal shape. In detail, the jig catcher 30 has a hexagonal shape. One of six corner portions 30a in the hexagonal shape is provided so that the position on the circumference is aligned with the position on the circumference of the key groove 24. The remaining five portions of the six corner portions 30a are provided at 60°, 120°, 180°, 240°, and 300° positions with respect to the key groove 24 on the circumference.

An annular recessed portion 28 is provided in an axial center portion of the outer peripheral surface of the rim 27 provided in the hub 21. An annular projection portion 43 is provided at a position corresponding to the annular recessed portion 28 in an axial center portion of the inner peripheral surface of the damper mass 41. The annular recessed portion 28 and the annular projection portion 43 configure a damper rubber stopper structure (convolution portion) 51 having a shape projecting in a radially inward direction to have an arc cross-sectional shape (waveform cross-sectional shape). A damper rubber stopper structure 51 engages the damper rubber 31 in the axial direction so that the damper rubber 31 press-fitted into the radial gap between the hub 21 and the damper mass 41 in a non-adhesion manner does not fall off from the gap.

In connection with the fact that the annular recessed portion 28 is provided in the axial center portion of the outer peripheral surface of the rim 27, a projection portion 29 having a shape projecting in the radially inward direction is provided in an axial center portion of the inner peripheral surface of the rim 27. The outer peripheral end portion 26b of the spoke 26 is integrally coupled to the projection portion 29.

The torsional damper 11 is provided with a reinforcement portion 61. The reinforcement portion 61 sets the directivity of height in a characteristic value (natural frequency) in the bending direction of the torsional damper 11. In order to achieve the purpose, the reinforcement portion 61 is provided in the two spokes 26 of the spoke 26 disposed so that position on the circumference thereof is aligned with the position on the circumference with the key groove 24 and the spoke 26 located at a 180° symmetrical position with the spoke 26. In detail, the two spokes 26 each are provided with a reinforcement rib 62 extending in the radial direction. In the front view illustrated in FIG. 1A, the characteristic value is set to be relatively high in the vertical direction and the characteristic value is set to be relatively low in the horizontal direction because the reinforcement portions 61 (reinforcement rib 62) are not provided.

The reinforcement rib 62 is integrally provided on one axial end surface side of the spoke 26 as illustrated in FIG. 1B. Space in which the three sides are surrounded by the spoke 26, the rim 27, and the corner portion 30a of the jig catcher 30 is formed. The reinforcement rib 62 is provided in the space in which the three sides are surrounded. In the reinforcement rib 62, an outer peripheral end portion 62b is integrally coupled to the rim 27, an inner peripheral end portion 62a is integrally coupled to the corner portion 30a of the jig catcher 30, and the reinforcement rib 62 is held from three directions by the spoke 26, the rim 27, and the jig catcher 30.

The torsional damper 11 is designed to be attached to a crankshaft of a 4-cylinder engine for automobile. The torsional damper 11 is assumed to be attached to a crankshaft in which the vibrations in the explosions of No. 1 and No. 4 pistons in a 4-cylinder engine are large. Bending vibrations in a direction where a vibration reduction is intended are vibrations generated in the explosions of No. 1 and No. 4 pistons. In the torsional damper 11, the position on the circumference of the key groove 24 provided in the inner peripheral surface of the hub 21 is positioned corresponding to the timing of the explosions of No. 1 and No. 4 pistons, and therefore, when No. 1 and No. 4 pistons are exploded, a bending moment is input in the vertical direction in FIG. 1A.

The torsional damper 11 exhibits the following operational effects.

(Increase in Rigidity in Bending Direction)

Figure 5:
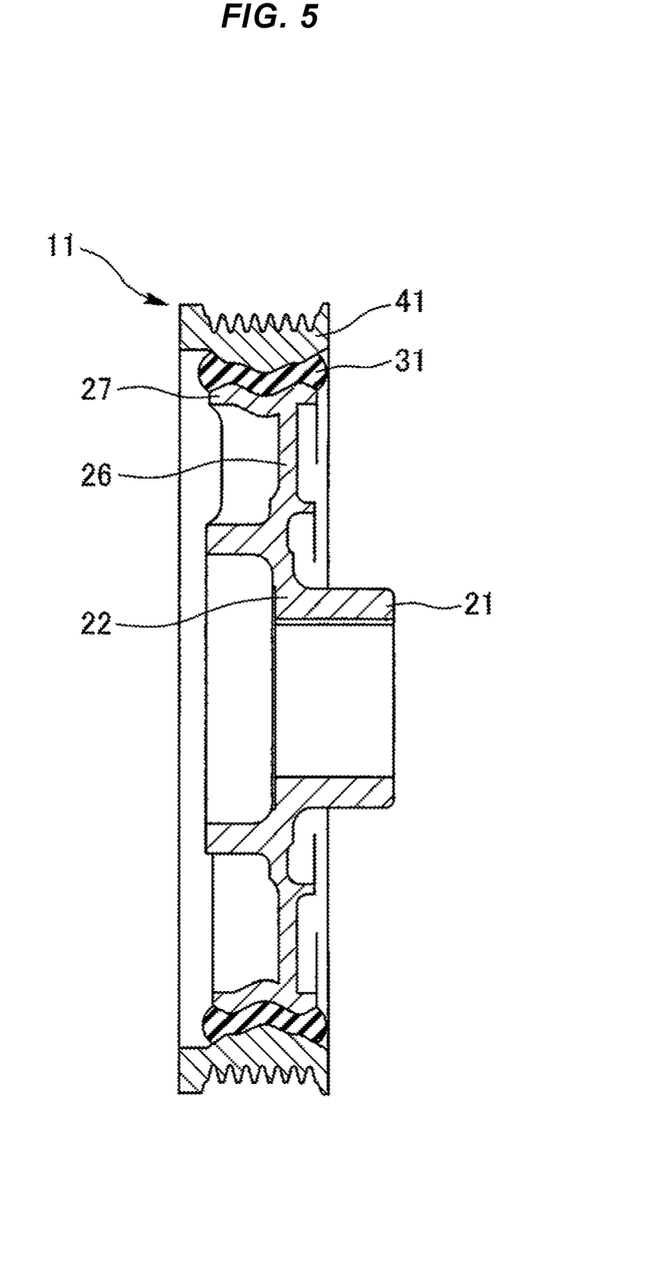
FIG. 5 is a cross-sectional view illustrating a torsional damper of a reference example.

FIG. 5 illustrates a torsional damper 11 of a reference example. The torsional damper 11 has a structure in which the damper mass 41 is connected to the hub 21 through the damper rubber 31 and the boss 22, the spokes 26, and the rim 27 are integrally provided in the hub 21. However, the plurality of spokes 26 connecting the boss 22 and the rim 27 are formed into a plane perpendicular to the shaft extended radially outward from the boss 22, and therefore it cannot be said that the rigidity in the bending direction is sufficient.

In the torsional damper 11 of the present embodiment, the plurality (4 spokes) of spokes 26 provided on the circumference each is formed into the inclined shape inclined in the axial direction, and therefore the spokes 26 each occupy space not only in the radial direction but in the axial direction and configure a three-dimensional structure. The plurality of spokes 26 each is integrally coupled not in an axial end portion but in the axial center portion of the rim 27 having a cylindrical shape. Therefore, the projection length in the axial direction of the rim 27 from the spoke 26 is set to be small, and thus deformation of the spoke 26 in which the spoke 26 is inclined to the rim 27, i.e., in such a manner as to shake a head, is hard to occur. Therefore, the rigidity in the bending direction of the torsional damper 11 can be increased.

(Positive Reduction in Bending Vibration in Direction where Vibration Reduction is Intended)

For example, when the vibrations in the explosions of No. 1 and No. 4 pistons are large in a 4-cylinder engine, it is considered to increase the rigidity in the bending direction of the torsional damper 11 with respect to a direction where the vibrations in the explosions of No. 1 and No. 4 pistons are input utilizing the fact that the rotation position on the circumference of the torsional damper 11 and the explosion timing of each piston have a correlation. Such a rigidity increase in the bending direction should shift the characteristic value (natural frequency) in the bending direction to the high frequency side and should positively reduce the bending vibrations in the explosions of No. 1 and No. 4 pistons.

In the torsional damper 11 of FIG. 5 illustrated as an reference example, the directivity on the circumference is not set in the rigidity in the bending direction, and therefore the bending vibration in the direction where a vibration reduction is intended cannot be positively reduced.

In the torsional damper 11 of the present embodiment, the reinforcement portions 61 are provided in the spokes 26 (upper and lower two spokes 26 in FIG. 1A) in one direction corresponding to the bending vibration in the direction where the vibration reduction is intended among the plurality (4 spokes) of spokes 26 provided on the circumference. Such an installation position of the reinforcement portion 61 sets the directivity on the circumference in the rigidity in the bending direction of the torsional damper 11 and enables the positive reduction in the bending vibration in the direction where the vibration reduction is intended. From the measurement values in a trial product, while the characteristic value in the horizontal direction increased by about 6%, the characteristic value in the vertical direction increased by about 19% in FIG. 1A. It was confirmed that the directivity on the circumference is set in the rigidity in the bending direction of the torsional damper 11.

(Weight Reduction)

The torsional damper 11 is provided with the damper rubber stopper structure 51 having a shape projecting in a radially inward direction. According to the damper rubber stopper structure 51, the projection portion 29 having a shape projecting in a radially inward direction is provided on the inner peripheral surface of the rim 27 and the outer peripheral end portion 26b of the spoke 26 is integrally coupled to the projection portion 29. The radial length of the spoke 26 becomes short corresponding to the radial length by the projection portion 29. As compared with the case where the outer peripheral end portion 26b of the spoke 26 is not integrally coupled to the projection portion 29 due to the reduction in the radial length of the spoke 26 (when the projection portion 29 and the spoke 26 are not coupled and separately formed), the weight of the hub 21 is reduced, so that the weight of the torsional damper 11 can be reduced. It is confirmed from the measurement values in a trial product that, while the characteristic values increased by about 6% and by about 19% as described above, the weight increase is only about 1.6%, and thus the weight increase rate is low.

(Improvement of Strength)

The reinforcement portion 61 is provided as the reinforcement rib 62 between the polygonal-shaped jig catcher 30 and the rim 27 as viewed from the front. The reinforcement rib 62 is formed in a shape in which the three sides are held by the jig catcher 30, the spoke 26, and the rim 27. Therefore, high strength can be given to the reinforcement rib 62.

Another Embodiment

As another embodiment, the spokes 26 do not necessarily need to be coupled to the projection portion 29 of the inner peripheral surface of the rim 27 insofar as the spokes 26 are obliquely provided toward the radially outside and one axial side from the boss 22.

Figure 3A:
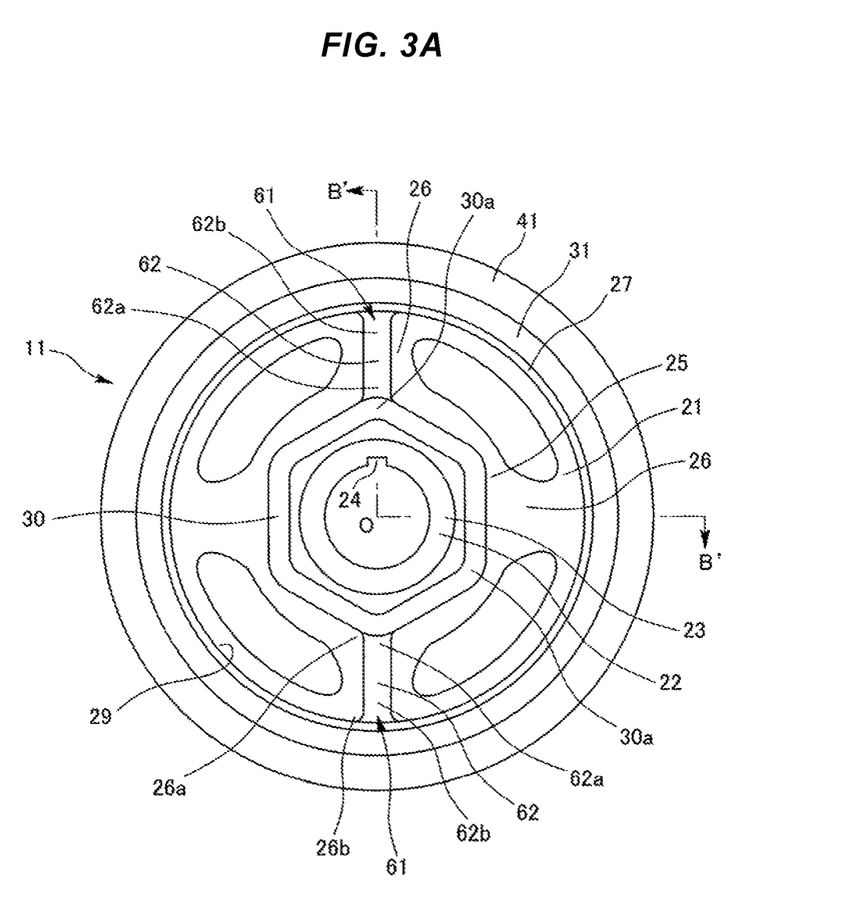
FIG. 3A is a front view illustrating another embodiment of a torsional damper.
Figure 3B:
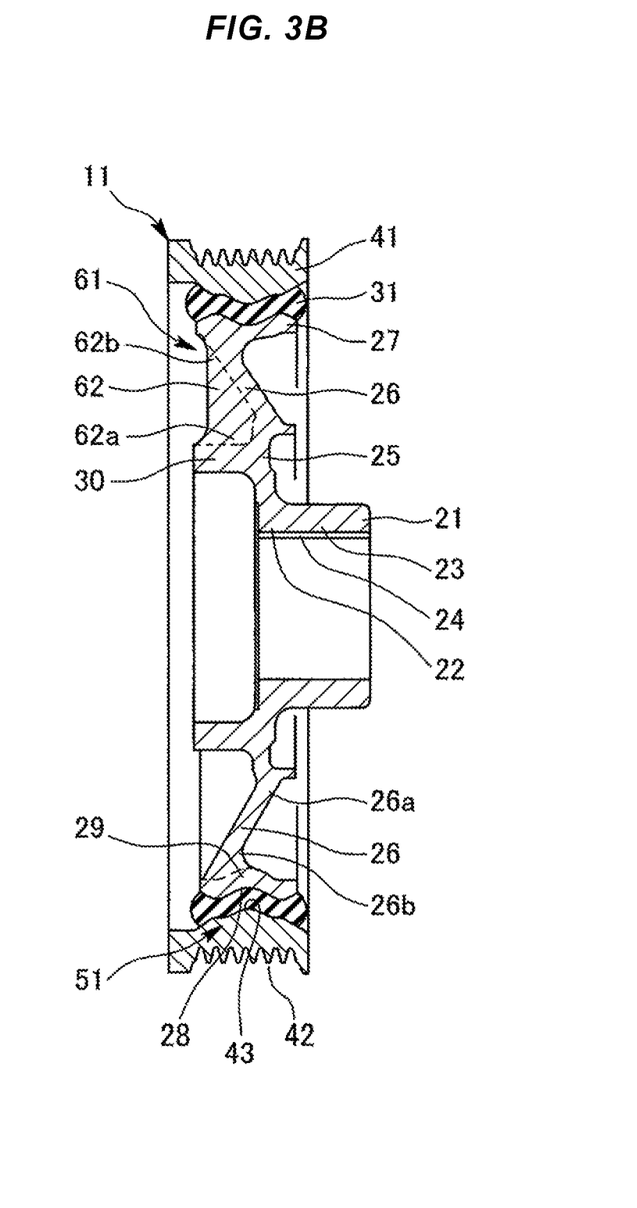
FIG. 3B is a cross-sectional view along the B'-O-B' line in FIG. 3A.
Figure 4:
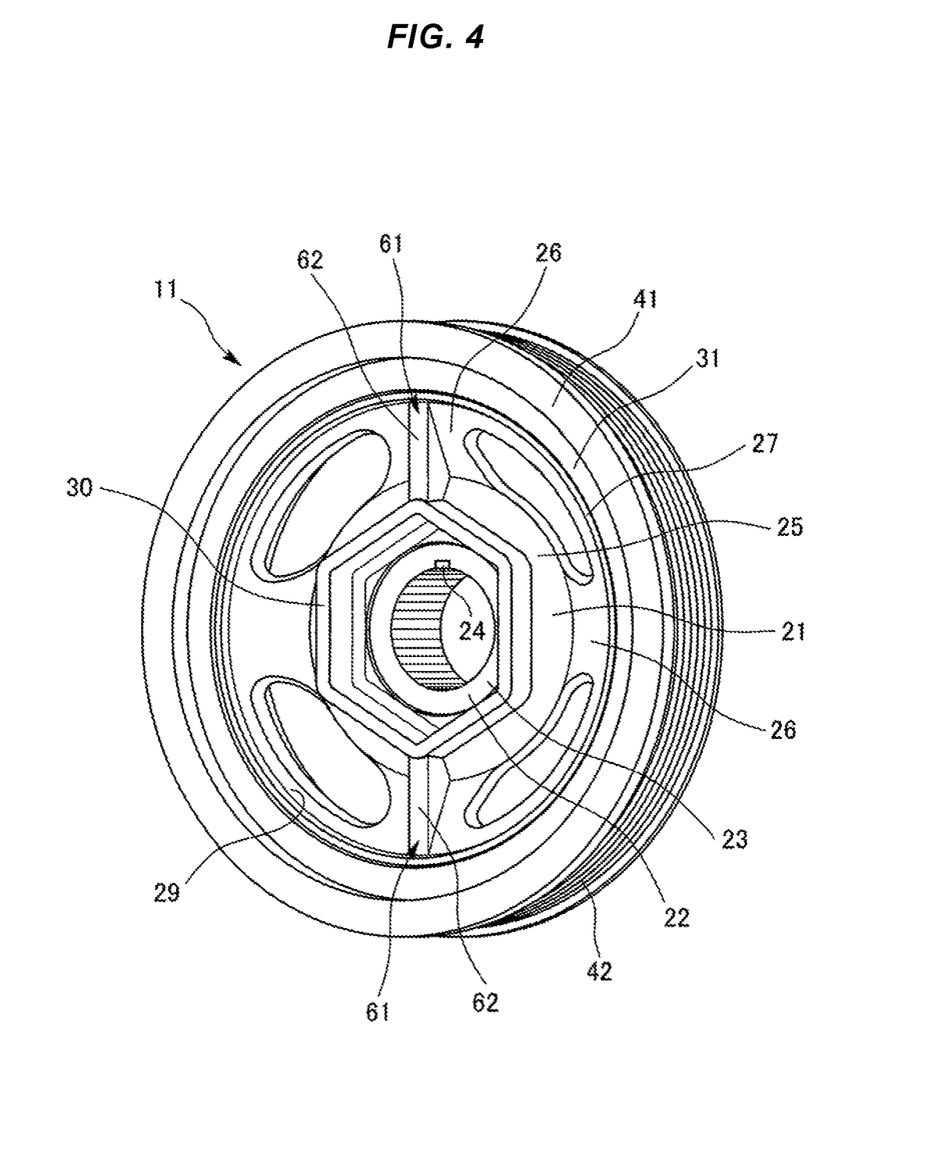
FIG. 4 is a perspective view of the torsional damper.

As an example thereof, in the torsional damper 11 of another embodiment illustrated in FIGS. 3A and 3B and FIG. 4, the inclination angle of the spokes 26 is set to be larger than that in the embodiment of FIGS. 1A and 1B and FIG. 2. The spoke 26 is also coupled to the inner peripheral surface of one axial side of the rim 27. The rigidity of the spoke 26 can be further increased although the weight increase amount by the reinforcement rib 62 is small as compared with FIG. 1 and FIG. 2.

As still another embodiment, the damper rubber stopper structure 51 may be omitted. As yet still another embodiment, the damper rubber stopper structure 51 may not have the inward projection shape and may have a shape projecting radially outward to have an arc cross-sectional shape.

Obviously, numerous modifications and variations of the present invention are possible in light of the above teachings. It is therefore to be understood that within the scope of the appended claims, the invention may be practiced otherwise than as specifically described herein.

What is claimed is:

1. A torsional damper, comprising:
   a hub having a boss fixed to a crankshaft and a rim provided on an outer periphery side of the boss and coupling the boss and the rim through a plurality of spokes branched in a radiation direction from the boss;
   a damper mass connected to the hub through a damper rubber;
   an inclined shape inclining the plurality of spokes in an axial direction; and
   reinforcement portion provided in the spokes in one direction corresponding to a bending vibration to be input among the plurality of spokes,
   wherein the hub concentrically has a tubular jig catcher for engaging a whirl-stop jig,
   the reinforcement portion has a rib shape connecting an inner periphery of the rim and an outer peripheral surface of the jig catcher,
   the jig catcher has a polygonal-shaped outer peripheral surface, and
   the reinforcement portion of the rib shape is coupled to a corner of the jig catcher.

2. The torsional damper according to claim 1, wherein the spoke is coupled to the rim at an axial center position of the rim.

3. The torsional damper according to claim 1, wherein the rim has a shape projecting radially inward on an inner peripheral surface, and
   the spoke is coupled to the projection shape.

4. The torsional damper according to claim 3, wherein the projection shape of the rim configures a damper rubber stopper structure having an arc cross-sectional shape with the damper rubber and the damper mass having a shape projecting radially inward.

\* \* \* \* \*

UNITED STATES PATENT AND TRADEMARK OFFICE
CERTIFICATE OF CORRECTION

PATENT NO. : 11,162,570 B2
APPLICATION NO. : 16/223732
DATED : November 2, 2021
INVENTOR(S) : Shinya Kinoshita et al.

Page 1 of 1

It is certified that error appears in the above-identified patent and that said Letters Patent is hereby corrected as shown below:

On the Title Page

Item (72), should read:
Inventors: Shinya Kinoshita, Tottori (JP); Yuki Ito, Wako (JP); Takashi Kondo, Waco (JP); Masaya Miyazawa, Waco (JP); Kei Mochizuki, Waco (JP)

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*